United States Patent [19]

Nilson

[11] 4,112,971

[45] Sep. 12, 1978

[54] SAFETY VALVE

[75] Inventor: Billy N. Nilson, Mjölby, Sweden

[73] Assignee: KeNova AB, Malmo, Sweden

[21] Appl. No.: 796,167

[22] Filed: May 12, 1977

Related U.S. Application Data

[62] Division of Ser. No. 564,080, Apr. 1, 1975, Pat. No. 4,061,254.

[30] Foreign Application Priority Data

| | | | |
|---|---|---|---|
| Apr. 4, 1974 | [SE] | Sweden | 7404749 |
| Nov. 20, 1974 | [SE] | Sweden | 7414566 |

[51] Int. Cl.[2] .................. F16K 31/12

[52] U.S. Cl. .................. 137/508; 222/494

[58] Field of Search .................. 137/508; 222/494

[56] References Cited

U.S. PATENT DOCUMENTS

| | | | |
|---|---|---|---|
| 1,709,948 | 4/1929 | Proctor | 222/494 |
| 1,880,103 | 9/1932 | Murdoch | 222/494 |
| 3,782,410 | 1/1974 | Steuby | 137/508 X |
| 3,826,280 | 7/1974 | Perham | 137/508 X |

*Primary Examiner*—Harold W. Weakley
*Attorney, Agent, or Firm*—Finnegan, Henderson, Farabow & Garrett

[57] ABSTRACT

A valve intended to open in response to a pressure difference between the interior of the valve and the exterior thereof comprises a diaphragm which in its closing position is conical. The diaphragm has an opening which is normally closed by means of a valve stem. Arrangements are made to prevent communication between the interior of the valve and the exterior thereof until said diaphragm has been deformed to a substantially planar shape.

7 Claims, 3 Drawing Figures

SAFETY VALVE

This is a division of application Ser. No. 564,080, filed 4/1/75, now U.S. Pat. No. 4,061,254.

This invention refers to a valve intended to be operative between a first and a second space, whereby one of said spaces may be the open air, and has the ability to open in response to a pressure difference between said spaces and to this end has a diaphragm, which in the normal closing position thereof is somewhat conical and downwardly sloping towards the centre, said diaphragm having an opening which is normally kept closed by a post or the like shaped as a valve stem.

When a valve of this type is connected for example to a tube containing a fluid and the interior of the tube defines one of the spaces mentioned in the preamble and the open air defines the second space the valve will form a self-closing closure for the tube. By manually squeezing the tube the pressure required for opening the valve may be generated and it is understood that the content of the tube will thereby be discharged through the valve opening. When the pressure, exerted upon the fluid contained in the tube is released the diaphragm returns to the original position thereof by means of its flexibility and hereby, the valve opening is being closed.

In order to deform the diaphragm from the above-mentioned original position in which the diaphragm angle may be called negative to a planar or flat position it is necessary that a relatively large force be applied to the diaphragm when the diaphragm reaches the planar position (zero angle) and continues towards a positive angle and the exposing of the valve opening has begun, the content of the tube has a high pressure at the same time as the valve opening is very small. A result thereof is that the discharge occurs rather like a surge and the successively increasing valve opening combined with a somewhat reduced pressure as a consequence hereby results in a spurt and uncontrolled discharge. For this reason valves of the type mentioned above have only found limited use.

Thus, the object of the invention is primarily to eliminate these drawbacks and to provide a simple and efficient valve, with smooth action, that may be utilized for a number of applications such as a self-closing closure, a safety valve, a control valve, etc.

To accomplish these and other objects the invention has the characteristics disclosed in the following claims.

In the accompanying drawing three exemplifying embodiments of the invention are illustrated.

According to the invention, steps are taken to prevent communication between the two spaces between which the valve is mounted from the position in which the diaphragm is in the normal position thereof (negative angle) until the same has been deflected to a substantially planar (zero angle) condition, when the valve opens.

Figure 1:
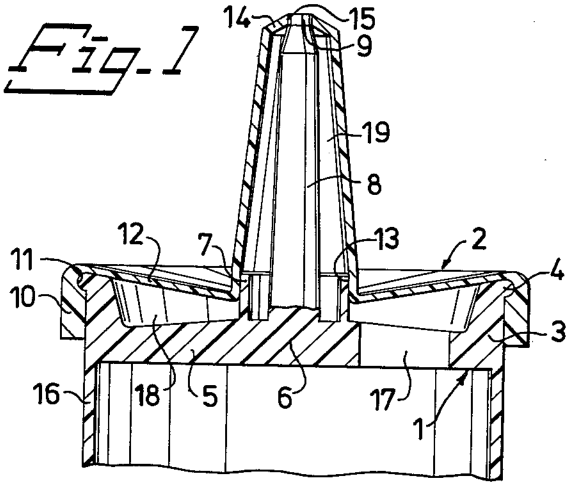
FIG. 1 is a section through a first embodiment of the invention.
Figure 2:
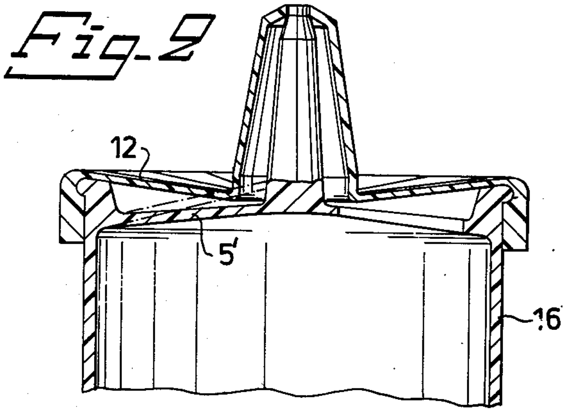
FIG. 2 is a section through a second embodiment.
Figure 3:
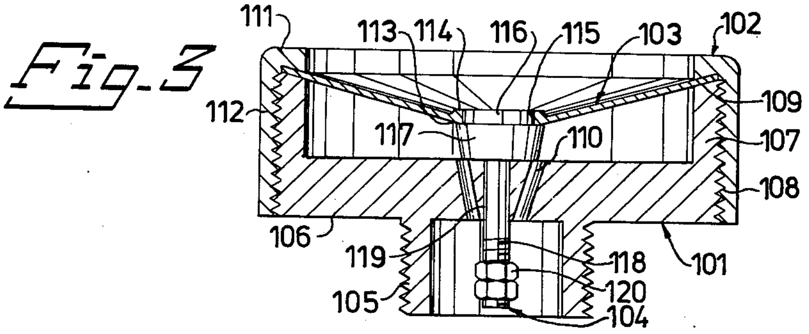
FIG. 3 is a section through a third embodiment in the shape of a safety valve.

In the embodiment shown in FIG. 1 this is accomplished by means of a partition means while in the embodiments according to FIGS. 2 and 3 this is achieved by making the valve post movable.

The valve illustrated in FIG. 1 comprises a first member having the general reference numeral 1 and a second member with the general reference numeral 2. In the embodiment shown, member 1 comprises an annular portion 3 which has a peripheral outwardly directed flange or bead 4 in the upper part thereof. The annular portion 3 communicates with a central bottom part 6 preferably by means of three ribs or spokes 5. The first member has a stem portion including an annular flange 7 as well as a post 8 projecting from said central bottom part and the post suitably has an end member 9 of reduced diameter. Similarly, the second member 2 of the valve has an annular portion 10 provided with an internal groove 11 into which the outwardly directed flange part or bead 4 of the main member 1 may snap. A thin-walled disc-shaped part 12, acting as a diaphragm, projects from said annular portion and said diaphragm continues in the central portion thereof into a sleeve 13 the lower portion of which being substantially cylindrical and sealingly surrounding the annular flange 7 of member 1. The sleeve has an upper end wall 14 provided with a discharge opening 15 which, as may be seen in FIG. 1, normally is kept covered by the end portion 9 of the post.

The two members of the valve according to the embodiment shown may be made from a suitable thermoplastic material by an injection moulding process and thus, may be fabricated to a low cost at the same time as the desired elasticity characteristics are achieved. In a manner not disclosed the valve is connected to a tube 16 or the like.

When a pressure is applied to the content of the tube said content will be pressed into the space 18 through the openings 17 between the spokes and as a result thereof, the central portion of the diaphragm 12 will be displaced in the direction outwardly from the tube. Upon this displacement, the valve opening will be successively exposed but pressurized content of the tube is by means of the co-operating flange 7 and sleeve 13 prevented from reaching the space 19. However, when the lower portion of sleeve 13 passes the upper edge of the annular flange 7 the pressurized fluid in space 18 may flow into space 19. However, when this occurs the opening 15 is totally clear of the post 8 and the discharge of the fluid therefore occurs at a relatively low speed and with a substantially constant opening area. As a result thereof an even and controlled flow of material through the valve opening 15 takes place.

As mentioned, a principally similar effect may be obtained for example by the closure shown in FIG. 2, which basically has the same structure as the closure described above, with the exceptions disclosed below. The parts of the closure being more or less identical with the corresponding parts of the closure shown in FIG. 1 are thus not explained. The closure according to FIG. 2 thus lacks the annular flange 7 and the ribs 5' are relatively thin and consequently flexible in contradistinction to the ribs or spokes 5 in FIG. 1.

In the non-assembled and untensioned condition of the closure, the spokes tend to occupy the position shown in dotted lines in FIG. 2 and it is understood that, consequently, the spokes are pre-tensioned in the assembled condition of the closure. Similarly to the embodiment in FIG. 1, the diaphragm part 12 pre-tensioned in its mounted condition so that it engages the post 8, 9 by a certain pressure in order to ensure a secure sealing action. The pre-tension of the diaphragm part is sufficient that the ribs 5' will take the position shown in full line in FIG. 2.

When the content of the tube is exposed to a pressure, the diaphragm 12 will be successively flattened out towards a planar position from its original position with a negative angle and will thereafter occupy a positive angle. By the pre-tensioning of the spokes they tend to occupy the position shown in dotted lines, which means that they during the first part of the movement of the diaphragm will follow the diaphragm. Thus, the post will not leave its grip with the opening 15 during this first deformation of the diaphragm.

The pre-tensioning and dimensioning are hereby so selected, that the spokes 5' reach their unloaded positions shown in dotted lines substantially when the diaphragm passes the zero angle, i.e. when the diaphragm is substantially flat. When passing this angle the deformation of the diaphragm occurs at a relatively low pressure and rapidly up to an upwardly bent position with a positive angle for the diaphragm and this leads to a rapid exposure of the opening 15. It is obvious that by the use of a device now described it is not possible to obtain such a gentle and equal discharge flow as is made possible with the embodiment according to FIG. 1, but experiments have shown that the improvement of the flow characteristics compared with known valves of this type, is considerable and in most cases fully sufficient.

A third possibility to realize the object of the invention is the valve structure according to FIG. 3. In this case the valve is intended to constitute a safety valve and comprises four members, generally designated 101, 102, 103 and 104, preferably all of them being made from a metal.

The first member 101 is a support and has a connection piece 105 preferably provided with threads or the like, projecting from a bottom 106 and an upwardly directed flange portion 107 forming an outer rim also projects therefrom. Flange portion 107 has an external threading 108 and the upper edge portion 109 thereof is oblique. The bottom 106 is perforated by a number of oblique bores 110. The second member 102 comprises an annular roof portion 111, which continues into a downwardly directed flange 112, having an internal threading 113 to engage the threading 108 of the second member 101. The third member 103, comprising a diaphragm, is as may be seen in FIG. 3 of conical shape in its initial position with a negative angle and the inclined angle in relation to the horizontal plane substantially corresponds to the inclination of the oblique edge portion 109. The central part 114 of the diaphragm is preferably thickened to form the lip of an opening 115.

The periphery of the diaphragm 103 is retained between the upper edge portion 109 of the outer rim 107 and the annular roof portion 111 leaving a flexible body portion extending inwardly. The members 101 and 103 form a cavity in the valve.

The fourth member 104 of the valve has an end portion 116 which is received in the opening 115 of the diaphragm 103 in the closed position of the valve as illustrated in FIG. 3. Below the end portion 116 of valve member 104 is defined an abutment portion 117 which engages the lower side of the edges of the opening 115 of the diaphragm 103 in the position illustrated in FIG. 3. As may be seen in FIG. 3, the upper openings of the obliquely positioned holes 110 are partially covered by the lower surface of the abutment portion 117, when the valve is closed. Further, the valve member 104 has a valve stem 118 running through a central opening 119 made for this purpose in the bottom of the support member 101. The free end of the valve stem 118 may be threaded so that a stop means 120 such as a nut and a locking nut may be attached to the same at a desired height level.

When the safety valve embodiment is utilized, such as in a container for pressurized air, the pressure tends to deflect the diaphragm 103. In case the pressure at which the valve opens, is exceeded, the diaphragm is deflected to such an extent that the diaphragm moves from the position shown in FIG. 3 defining a negative angle first becoming substantially planar and then continuing into a positive angle. During this movement to the zero position, i.e. planar position of the diaphragm, the valve member 104 been carried along with the diaphragm, which means that the valve does not open.

The position of the stop means 102 is therefore so selected that it will engage the bottom of the connection piece 105 when the diaphragm reaches the substantially planar position. By the continued deformation of the body portion of the diaphragm 103 which in the vicinity of the planar position occurs rapidly and with low resistance, the opening 115 of the diaphragm will be disengaged from the projection 116 and a pressure reduction in the valve cavity takes place. By the disengagement of the opening 115 the discharge will become great, since the deflection of the diaphragm beyond the planar position occurs rapidly as described. Upon the rapid pressure reduction in the valve cavity, the valve member 104 tends to be pressed downwardly to its initial position, thus giving a maximum discharge opening 115. When the pressure has reached a predetermined low valve the diaphragm again returns and closes to its initial position thereby closing the valve.

It has been observed that no special sealing means are required in the valve structure which naturally leads to a considerable advantage in itself. In order to obtain a baffling, such as a noise baffling, of the gas or fluid-stream escaping from the opening a suitable deflection means may be provided in front of the opening, to force the stream of issuing fluid to reverse.

I claim:

1. A self-resetting pressure release valve opening in response to a predetermined pressure and closing upon release of said pressure comprising:

a cuplike body having a base and a wall upstanding therefrom;

a valve member including a depending stem slidably mounted in said base and an abutment portion located in said body and movable with said stem, the abutment portion having a lower surface resting on the inner surface of said base in the closed position of the valve and an upper surface having thereon a cylindrical projection circumscribed by an annular shoulder;

an integral resilient annular diaphragm having a conical configuration when unstressed and passing through a substantially planar position under a predetermined pressure, said annular diaphragm having its outer periphery attached to said wall for positioning said diaphragm concavely in said body and having its inner periphery resting directly on said shoulder in the closed position of said valve, said body, diaphragm and abutment portion forming a cavity in said valve;

a plurality of passages through said base for applying fluid pressure to the lower surface of said abutment portion and into said cavity for stressing said diaphragm outwardly, said valve member being carried along with said diaphragm; and means for separating said valve member from said diaphragm substantially at the planar position of the diaphragm, whereby said valve is opened.

2. The valve of claim 1 wherein said diaphragm is rigidly attached to said wall.

3. The valve of claim 2 wherein said wall has a circular cross-section, is threaded on its outer surface, and has its outer edge inwardly beveled and wherein said valve also includes a collar for threaded attachment to said wall and for locking said diaphragm between the collar and the beveled edge of said wall.

4. The valve of claim 1 wherein said separating means includes means on said stem interacting with the outer surface of said base for limiting the axial movement of said stem.

5. The valve of claim 4 wherein the movement-limiting means of said separating means is adjustable.

6. The valve of claim 1 wherein said passages are spaced about said stem, said abutment portion partially covering at least part of the plurality of passages in the closed position of the valve.

7. The valve of claim 6 wherein said valve also includes a threaded connecting cylinder on the outer surface of said base, said stem extending into said connecting cylinder.

* * * * *